No. 614,176. Patented Nov. 15, 1898.
W. T. MURRAY.
FOLDING TRUCK.
(Application filed Feb. 2, 1898.)
(No Model.) 2 Sheets—Sheet 1.
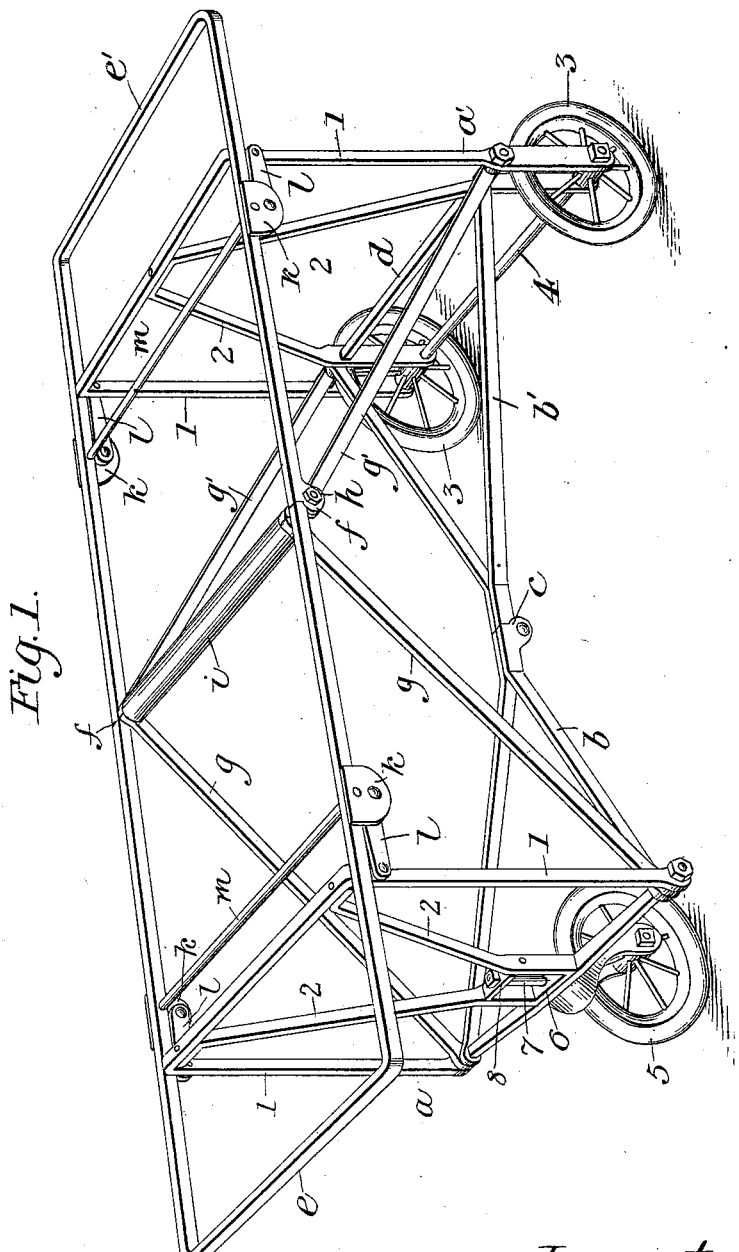
Witnesses:
D. W. Edelin.
E. M. Young
Inventor:
W. T. Murray,
by Leuuie & Goldsborough,
attys.

No. 614,176. Patented Nov. 15, 1898.
W. T. MURRAY.
FOLDING TRUCK.
(Application filed Feb. 2, 1898.)
(No Model.) 2 Sheets—Sheet 2.
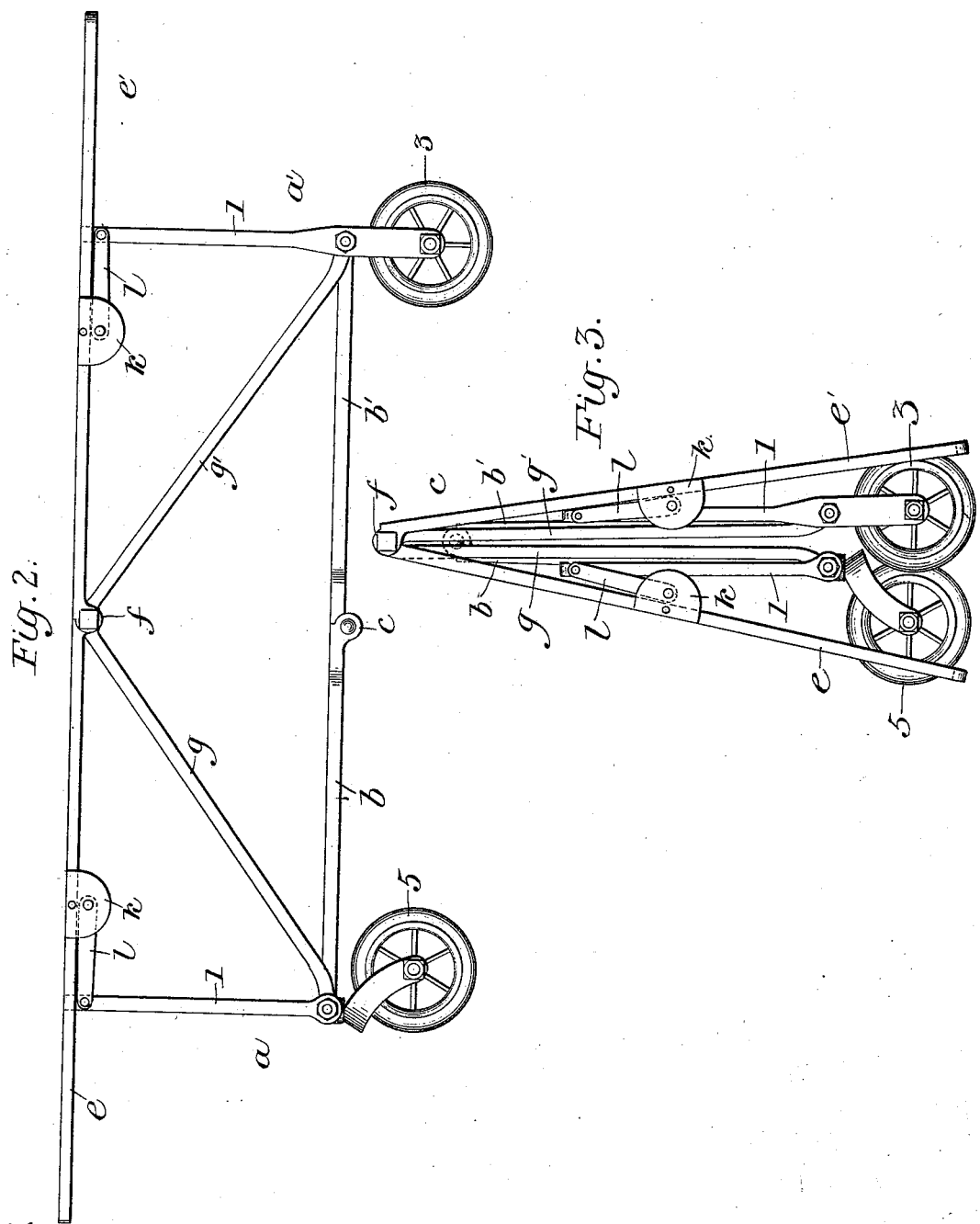
Witnesses:
O. W. Edelin.
E. M. Young
Inventor:
W. T. Murray,
by Pennie & Goldsborough,
Att'ys.

UNITED STATES PATENT OFFICE.

WILLIAM T. MURRAY, OF HARROD, OHIO.

FOLDING TRUCK.

SPECIFICATION forming part of Letters Patent No. 614,176, dated November 15, 1898.

Application filed February 2, 1898. Serial No. 668,843. (No model.)

*To all whom it may concern:*

Be it known that I, WILLIAM T. MURRAY, a citizen of the United States, residing at Harrod, in the county of Allen and State of Ohio, have invented certain new and useful Improvements in Folding Trucks; and I do hereby declare the following to be a full, clear, and exact description of the invention, such as will enable others skilled in the art to which it appertains to make and use the same.

The invention relates to folding trucks, and especially to that class of devices employed as funeral-trucks or traveling biers.

The object in view is to provide a light easy-running noiseless truck that may be folded up into small space when not in use and easily and quickly unfolded and extended when required, and it is characteristic of the invention that it has no detachable or other parts requiring adjustment and connection, all parts of the apparatus being permanently connected.

The invention is illustrated in the accompanying drawings, forming part of this specification, in which—

Figure 1 is a perspective view of the truck ready for use. Fig. 2 is a side elevation of the same, and Fig. 3 is a side view of the device when folded.
The truck consists, essentially, of a pair of wheel-frames connected together by hounds that are pivoted together at the center and to the wheel-frames at their outer ends. The wheel-frames are located a distance apart dependable upon the length of truck desired and are provided with rubber-tired wheels, of which that or those at one end are swiveled caster-like. At a suitable distance above the hounds the platform of the truck is located, said platform being formed in two sections pivoted together at the center and supported at this point by diagonal braces extending upward and inward from the wheel-frames, the outer ends of the platform-sections being supported by the upper ends of the wheel-frames. The hounds, braces, and platform-sections are pivotally connected in the same vertical plane at the center of the truck, so as to fold up, as shown in Fig. 3, and the upper ends of the wheel-frames are so connected to the outer portions of the platform-sections that as these sections fold together the frames, braces, and hounds all fold into substantial parallelism and bring all parts of the truck into the compact folded condition clearly represented in the third figure.

Referring more particularly to Fig. 1, the letters $a$ and $a'$ indicate, respectively, the front and rear wheel-frames. The invention is not limited to any specific construction of these frames; but the convenient forms shown in the drawings consist of the inverted-U-shaped bars 1 and truss-braces 2, inclosed by the bars and connected to the horizontal top member at their upper ends and to the lower part of the frames at the other ends. The rear frame carries two wheels 3 3, mounted on a through-axle 4, and the front frame carries a single caster-wheel 5, swiveled in the bottom member 6 of said frame by means of the caster-pintle 7 passing up through said member and through a small cross-piece 8, connecting the arms of the truss-brace 2. To these wheel-frames are pivoted the hounds $b$ and $b'$, which extend upwardly and are pivotally connected together by a stump or rule joint $c$, so as to fold upwardly, but not in the opposite direction. The front hound is connected to its wheel-frame by being pivoted to the outer ends of the lower horizontal member of said frame, and the rear hounds are pivoted to a rod or bar $d$, bolted through the frame $a'$ from side to side on a level with the lower member of the front wheel-frame.

The wheel-frames may be of any desired height, and at or about the level of their upper ends is supported the platform of the truck. This platform consists of two sections $e$ and $e'$, each being in the form of a skeleton frame composed of a metallic bar bent into rectangular form. These two sections are pivoted together at their inner ends by stump or rule joints $f f'$, and their outer ends are supported by the upper ends of the wheel-frames in a manner which will be presently described. At the center of the truck where the sections are pivoted together the platform is supported by diagonal braces $g$ and $g'$, pivotally connected to the wheel-frames at their lower ends and extending inwardly and upwardly to the point where the platform-sections join, where they are pivoted on a rod or bar $h$, which extends through from side to side of the platform and forms the pintle of the section-hinges. This bar may conveniently have a wooden roller $i$ journaled upon it, as shown in Fig. 1. The pivotal connections of the diagonal braces with the wheel-frames are coincident with the pivots connecting the hounds with the frames, and the pivots by means of which the upper ends of the braces are connected to the truck-platform being coincident with each other and with the joints between the platform-sections it will be seen that the wheel-frames, the hounds, the braces, and the platform-sections may all fold up into substantial parallelism, as represented in Fig. 3, thus reducing and compacting the size of the truck into practically the width or thickness of the several bars forming these parts. Were it possible with such an arrangement to keep the wheel-frames upright when the truck is in operation, it would be sufficient to have the platform-sections rest loosely on the upper ends of the frames or on pins projecting from the side bars for their support; but as the hounds and braces are pivotally connected to the wheel-frames at the same point the frames could probably not be maintained erect without some connection between their upper portions and their respective platform-sections, and in order to make such a connection as will maintain the necessary vertical position of the frames when the truck is in use and at the same time to permit them to fold up, as already explained, I connect their upper ends to the platform-sections by means of short links $l\ l$. These links are pivoted to pins projecting from the outer faces of the side bars of the wheel-frames and extend inward and along the under sides of the side bars of the platform-sections, where they are pivoted to lugs $k\ k$, depending from the same. In order to strengthen the platform-sections, I run stay-rods $m\ m$ across the same and through the side bars at points near where the links are pivoted. Similar stays may be located at other convenient points, if desired, and the platform-sections and wheel-frames may be stiffened and braced in any way desired.

The construction being as above described, the operation of folding and unfolding the truck will be readily understood from the drawings without further description, except, perhaps, to explain the action of the link connection between the platform-sections and the wheel-frames, which is as follows: The truck being extended and in condition for use, as shown in Figs. 1 and 2, and it being desired to fold it up, the joints between the inner ends of the hounds, the braces, and the platform-sections are bent upwardly. This permits the links $l\ l$ to move around on their pivotal connection with the platform-sections in the direction indicated by the arrows in Fig. 2 and to assume the position with respect to the wheel-frames and said sections represented in Fig. 3, permitting the compact folding of all the parts together and at the same time providing a permanent connection between the wheel-frames and the platform-sections. In unfolding the truck the reverse of the above-described movements takes place, and the side bars of the sections $c\ e'$ rest upon the links $l\ l$, thereby firmly supporting the outer ends of the same from the wheel-frames.

Although I have shown but a single caster-wheel swiveled in the front wheel-frame, it is to be understood a pair of wheels may be used at this point, if desired, and although I have located the caster wheel or wheels at the front of the truck they may be located at the rear with practically the same result.

Having thus described my invention, what I claim is—

1. In a folding truck, or the like, the combination of wheel-frames at opposite ends, and front and rear hounds pivotally connected together at their inner ends, the truck-platform being composed of sections pivotally connected together midway between the wheel-frames, and the latter being connected to the platform-sections by links.

2. In a folding truck, or the like, the combination of wheel-frames at opposite ends, front and rear hounds pivotally connected together at their inner ends, a platform composed of sections pivoted together midway between the wheel-frames, braces pivotally connected at their outer ends to the wheel-frames and having their inner ends pivoted to the platform at the joint between the sections, and links pivotally connecting the wheel-frames to the platform-sections.

3. In a folding truck, or the like, the combination of wheel-frames at opposite ends, front and rear hounds pivotally connected together at their inner ends, a platform composed of sections pivoted together midway between the wheel-frames, and links connecting the upper ends of the wheel-frames with their respective platform-sections and adapted to support the outer ends of the sections when the truck is extended.

4. In a folding truck, or the like, the combination of wheel-frames at opposite ends, front and rear hounds pivotally connected at their inner ends by a stump or rule joint, an elevated platform composed of sections stump or rule jointed together at their inner ends, pivoted braces extending from the lower parts of the wheel-frames upward and inward and connected to the platform at the section-joints, and links pivoted to the wheel-frames near their upper ends and to their respective platform-sections at a point inward from the position of the wheel-frames when the truck is extended.

5. In a folding truck, or the like, the combination of wheel-frames at opposite ends, front and rear hounds extended inwardly from said frames and pivotally connected together midway of the length of the truck, a platform composed of sections pivotally connected together at their inner ends in the vertical plane of the pivot of the hounds, and links pivotally connecting the outer portions of the platform-sections to the upper ends of the respective wheel-frames.

6. In a folding truck or the like, the combination of wheel-frames at opposite ends, front and rear hounds extending inwardly and pivotally connected together, and an elevated platform composed of sections pivotally connected together at their inner ends and supported by the wheel-frames at their outer ends.

7. In a folding truck, or the like, the combination of wheel-frames at opposite ends, front and rear hounds pivoted to the wheel-frames and extending inwardly and pivotally connected together, an elevated platform composed of sections pivotally connected together at their inner ends, and braces pivoted to the wheel-frames coincidentally with the hounds, and to the platform coincidentally with the joint between the sections.

In testimony whereof I have hereunto set my hand, this 21st day of January, 1898, in the presence of two subscribing witnesses.

WILLIAM T. MURRAY.

Witnesses:
G. W. KINSELY,
R. C. EASTMAN.